United States Patent
Studnitzer et al.

(10) Patent No.: US 11,625,569 B2
(45) Date of Patent: Apr. 11, 2023

(54) DEEP LEARNING FOR CREDIT CONTROLS

(71) Applicant: Chicago Mercantile Exchange Inc., Chicago, IL (US)

(72) Inventors: Ari Studnitzer, Northbrook, IL (US); David Geddes, Belfast (GB); Inderdeep Singh, Palatine, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 1468 days.

(21) Appl. No.: 15/467,632

(22) Filed: Mar. 23, 2017

(65) Prior Publication Data

US 2018/0276541 A1    Sep. 27, 2018

(51) Int. Cl.
  G06N 3/08   (2006.01)
  G06N 3/04   (2023.01)
  G06Q 40/04  (2012.01)
  G06N 3/084  (2023.01)

(52) U.S. Cl.
  CPC ............ G06N 3/04 (2013.01); G06N 3/0445 (2013.01); G06N 3/0454 (2013.01); G06N 3/084 (2013.01); G06Q 40/04 (2013.01)

(58) Field of Classification Search
  CPC ....... G06N 3/02–088; G06N 5/00–048; G06N 20/00–20; G06Q 20/4015–4018; G06Q 20/405–40975; G06Q 20/401–4018
  USPC ............... 706/12, 15–32, 45–61; 705/75–79
  See application file for complete search history.

(56) References Cited

U.S. PATENT DOCUMENTS

| | | | |
|---|---|---|---|
| 5,819,226 A | 10/1998 | Gopinathan et al. | |
| 6,029,154 A | 2/2000 | Pettitt | |
| 7,653,739 B1 | 1/2010 | Kalker et al. | |
| 7,769,667 B2 | 8/2010 | Glinberg et al. | |
| 7,831,491 B2 | 11/2010 | Newell et al. | |
| 8,458,069 B2 | 6/2013 | Adjaoute | |
| 9,185,095 B1* | 11/2015 | Moritz | H04L 63/0861 |
| 2002/0099649 A1* | 7/2002 | Lee | G06Q 20/4016 705/38 |
| 2005/0096999 A1 | 5/2005 | Newell et al. | |
| 2014/0114815 A1* | 4/2014 | Dangott | G06Q 40/00 705/30 |
| 2014/0250009 A1 | 9/2014 | Carlson | |
| 2014/0310159 A1* | 10/2014 | Zoldi | G06Q 20/4016 705/39 |
| 2014/0316984 A1* | 10/2014 | Schwartz | G06Q 20/40145 705/44 |

(Continued)

OTHER PUBLICATIONS

Xiong et al. "Recognition of geochemical anomalies using a deep autoencoder network", 2016, Computers &Geosciences 86.*

(Continued)

*Primary Examiner* — Jue Louie
(74) *Attorney, Agent, or Firm* — Lempia Summerfield Katz LLC

(57) ABSTRACT

Systems and methods are provided to identify abnormal transaction activity by a participant that is inconsistent with current conditions. Historical participant and external data is identified. A recurrent neural network identifies patterns in the historical participant and external data. A new transaction by the participant is received. The new transaction is compared using the patterns to the historical participant and external data. An abnormality score is generated. An alert is generated if the abnormality score exceeds a threshold.

26 Claims, 8 Drawing Sheets

(56) References Cited

U.S. PATENT DOCUMENTS

| | | | | |
|---|---|---|---|---|
| 2015/0254555 | A1* | 9/2015 | Williams, Jr. | G06N 3/0454 706/14 |
| 2015/0278819 | A1* | 10/2015 | Song | G06Q 20/042 705/45 |
| 2016/0155136 | A1* | 6/2016 | Zhang | G06N 3/0454 705/7.29 |
| 2017/0017887 | A1* | 1/2017 | Waradkar | G06Q 40/00 |
| 2018/0089695 | A1* | 3/2018 | Voorhees | G06Q 50/184 |

OTHER PUBLICATIONS

Malhorta et al. "Long ShortTerm Memory Networks for Anomaly Detection in Time Series", 2015, ESANN 2015 proceedings, European Symposium on Artificial Neural Networks.*

Golmohammadi et al. "Time Series Contextual Anomaly Detection for Detecting Market Manipulation in Stock Market", 2015, 2015 IEEE International Conference on Data Science and Advanced Analytics.*

Examination Report from, European Application No. 18716744, dated Jul. 29, 2020, EP.

International Search Report and Written Opinion, from PCT/US2018/023307, dated May 16, 2018, WO.

Quoc Viet Le, "A Tutorial on Deep Learning Part 2: Autoencoders, Convolutional Neural Networks and Recurrent Neural Networks", Retrieved from the Internet: URL:https://cs.stanford.edu/-quocle/tutorial2.pdf, Oct. 20, 2015.

Abhinav Srivastava et al., "Credit Card Fraut Detection Using Hidden Markov Model", IEEE Transactions on Dependable and Secure Computing, Jan.-Mar. 2008, pp. 37-48, vol. 5, No. 1.

Brecht Schipper, "PhD Candidate in Machine Learning Risk Management in Trading Activities", Computational Science, University of Amsterdam, Jan. 19, 2016, 2 pages.

Christopher Olah, "Understanding LSTM Networks", Blog, Aug. 27, 2015, 8 pages, http://colah.github.io/posts/2015-08-Understanding-LSTMs/.

K. Anupriya et al., "Predicting Eshopping Data Using Deep Learning", Middle-East Journal of Scientific Research, 2016, pp. 250-256, 24 (S1).

Kyunghyun Cho et al., "Learning Phrase Representations using RNN Encoder-Decoder for Statistical Machine Translation", Cornell Univeristy Library, https://arxiv.org/abs/1406.1078, Sep. 3, 2014, 15 pages.

Nitish Srivastava, "Unsupervised Learning of Video Representations using LSTMs", Cornell University Library, https://arxiv.org/pdf/1502.04681.pdf, Jan. 4, 2016, 12 pages.

PC Plus, "Are PCs to Blame for the Financial Mess We're In?", TechRadar, Oct. 8, 2011, 13 pages.

Phil Winder, Presentation: "Modern Fraud Prevention Using Deep Learning", Copenhagen International Software Development Conference 2015.

Raghavendra Patidar et al., "Credit Card Fraud Detection Using Neural Network", International Journal of Soft Computing and Engineering, Jun. 2011, pp. 32-38, vol. 1, Issue NCAI2011.

Snehal Patil et al., "Credit Card Fraut Detection Using Decision Tree Induction Algorithm", International Journal of Computer Science and Mobile Computing, Apr. 2015, pp. 92-95, vol. 4, Issue 4.

Tyler Durden, "This is what Happens when an HFT Algo Goes Totally Berserk and Serves Knight Capital with the Bill", ZeroHedge, Aug. 1, 2012, 10 pages.

Y. Sahin et al., "Detecting Credit Card Fraud by Decision Trees and Support Vector Machines", Proceedings of the International MultiConference of Engineers and Computer Scientists 2011, Mar. 16-18, 2011, 6 pages, vol. I, Hong Kong.

* cited by examiner

DEEP LEARNING FOR CREDIT CONTROLS

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

Typically, the Exchange provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting, and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Credit risk may be managed by implementing pre-trade credit controls. Pre-trade credit controls may set pre-defined limits for parties that, if breached, prevent entry or execution of undesirable trades. Post-trade credit controls may additionally limit a party's activity to risk reducing trades if a customer's pre-defined credit limit has been breached. Both pre- and post-trade credit control options are inherently reactive in nature, waiting for a party to actually breach pre-defined limits. As such, both types of credit controls rely on setting fixed limits. However, such fixed limits do not detect or prevent undesirable activity such as rapid oscillations between long and short positions within the risk limits set by the customer that may nevertheless results in large losses.

DETAILED DESCRIPTION

Figure 1:
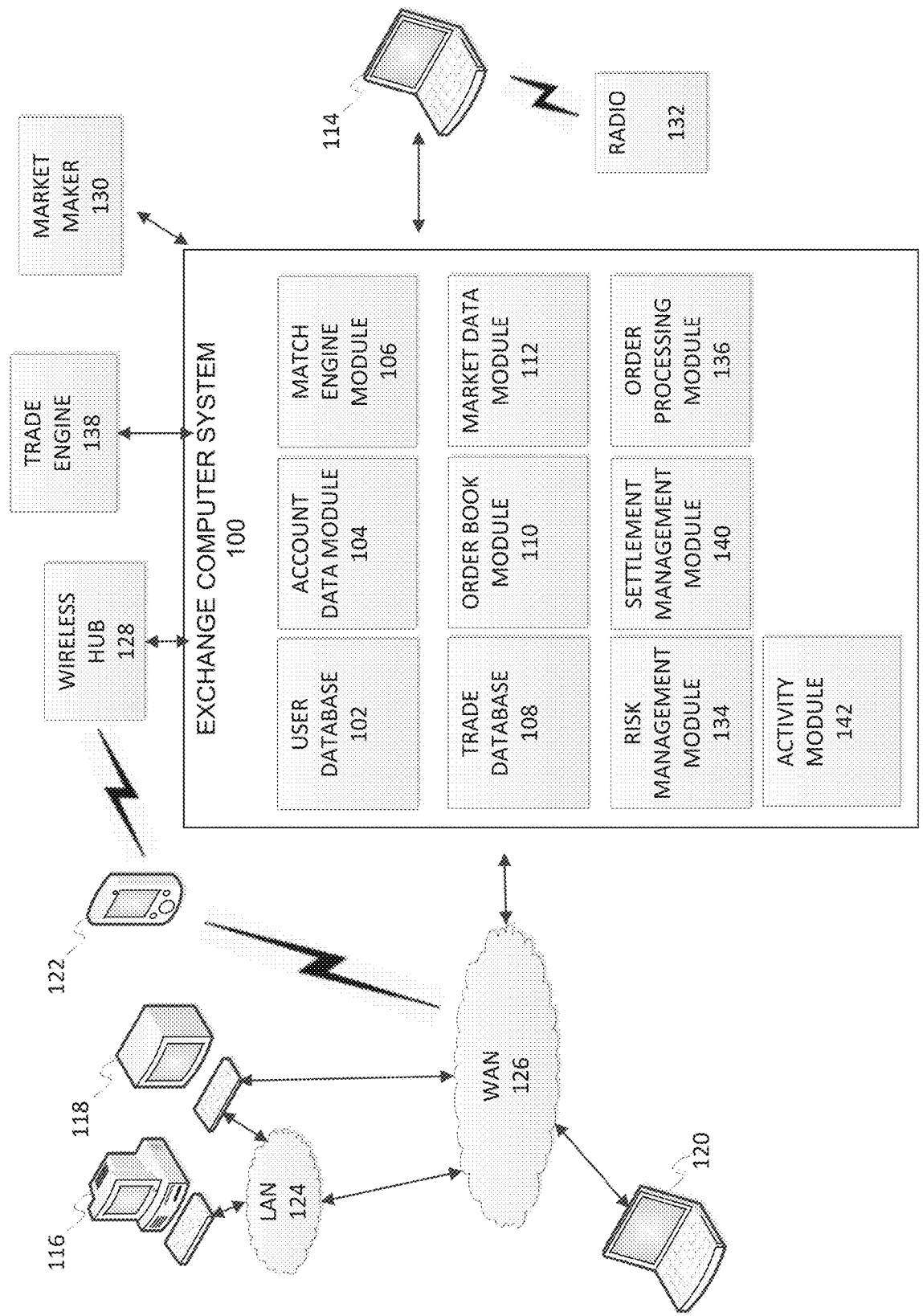
FIG. 1 depicts an illustrative computer network system that may be used to implement aspects of the disclosed embodiments.

The disclosed embodiments relate generally to a system that analyzes and learns a participant's historical transactional patterns and strategies, and proactively monitors if a participant's present transactional activity deviates therefrom in a manner inconsistent with current external conditions so as to pose a risk to that participant. Embodiments provide a two-step process that includes training a model with historical transactional and external data and inputting current transactional data to detect abnormal activity.

To mitigate credit risk, an Exchange may attempt to identify abnormal activity. In one example, the Exchange may provide a platform for traders that provide passive liquidity. Passive liquidity providers may operate using algorithms that track the market and place respective orders. The actions of passive liquidity providers may magnify any abnormal incidents. A credit risk management system may be used to track how often the liquidity providers place orders. However, due to the movement of pricing and valuation throughout a trading day, it is hard to discern which activity from the liquidity providers is detrimental. The sheer volume and execution rate of trading algorithms mean that when issues occur, it may be too late for a firm to take corrective actions even with a trading firm stop button in place to cancel all orders & quotes from or to an exchange.

In a simple system for monitoring credit of credit card users, issuers of credit have sought to limit fraud losses by attempting to detect fraudulent use before the cardholder has reported a lost or stolen card. One technique is known as parameter analysis. A parameter analysis determines fraud using a small number of database fields combined in a simple Boolean condition. An example of such a condition is: if (number of transactions in 24 hours>X) and (more than Y dollars authorized) then flag this account as high risk.

In more complex systems, fraud may be detected using predictive modeling. A system may receive data that results from a transaction. For a credit card fraud detection program, such data may include cardholder account information, merchant account information, and payment information such as date, time, and amount. Data may be received from both genuine and fraudulent, approved and unapproved transactions. The data may then be parsed to determine whether a transaction has a high risk of being fraudulent. Each transaction is compared with a cardholder's history or an acceptor history to determine which transactions appear abnormal. Qualities about a transaction such as the amount, date, time, and type (e.g., restaurant, online, etc.) may be considered when determining whether a transaction may be a fraudulent transaction. Complex systems may use other types of analysis or modeling such as statistical analysis, decision trees, or data mining techniques.

Statistical analysis or decision trees identify statistical similarity quickly by employing linear mathematical models or simple conditional logic but resulting in a much more fitted model that is often biased by the magnitude of the inputs and fails quickly when a new characteristic appears in the data. Data mining techniques may be fast at identifying the probabilistic occurrence of a sequence of events with another. The data, if normalized well, may result in no bias to the magnitude of the input. Data mining techniques may be able to learn in an unsupervised manner when compared to the statistical approach but are also limited in the ability to handle the degree of variation in its input from what it has seen in the past.

Advanced modeling systems may be used, such as regression analysis or deep learning though neural networks. Regression analysis is a statistical process for estimating the relationships among variables. Regression analysis may be used to identify the strength of the relationship between two variables such as how the price of a contract is related to interest rates. Regression takes a group of random variables, thought to be predicting an outcome, and tries to find a mathematical relationship between them. Regression analysis has drawbacks in that regression analysis is sensitive to outliers and overfitting. Regression analysis further may not include an efficient feedback loop and as such has difficulties adapting to new data.

Neural networks may be made up of a collection of interconnected processing nodes. The connections between the nodes may be dynamically weighted. Neural networks employ a technique of learning relationships through repeated exposure to data and adjustment of internal weights. Neural networks allow quick model development and automated data analysis. Neural networks provide statistical modeling that is capable of building models from data containing both linear and non-linear relationships. While similar in concept to regression analysis, neural networks may capture nonlinearity and interactions among independent variables without pre-specification. Whereas traditional regression analysis requires that nonlinearities and interactions be detected and specified manually, neural networks perform these tasks automatically.

There are different types of neural networks. Two distinct types are feedforward neural networks (FNN) and recurrent neural networks (RNN). Neural networks include input layers, hidden layers, and output layers. For a FNN, the information (data) proceeds from input to hidden to output in one direction. There are no loops or feedback in a feedforward neural network. A drawback for a feedforward neural network is that a feedforward neural network lacks the temporal awareness, e.g. does not discover inter-relationships between adjacent inputs in a series of inputs. In a trading example, it may be important to identify and understand the nearest historical events as the events may influence the current activity. A feedforward network is agnostic to how event relate to one another.

A recurrent neural network includes cycles, e.g. computations derived from earlier inputs are fed back into the network. The feedback or loop allows for a kind of memory in the network. As such, recurrent neural networks are dynamic and include a state that changes continuously until the recurrent neural network reaches an equilibrium point. The recurrent neural network remains at the equilibrium point until the input changes and a new equilibrium is found.

In each of these previous systems, the only data used for the model is the customer's data. The fraud predictive model and the credit risk model do not consider external factors. Both the simple system, complex system, and advanced system for credit risk monitoring lack external factors, e.g. all three systems include customer level data that is analyzed to generate a model that predicts the risk of the customer's transactions.

Embodiments herein, provide a recurrent neural network that makes use of both participant and external factors to identify activity that deviates from prior activity and prior conditions. Activity that deviates from prior activity may be activity that is quantifiably past a threshold deviance from normal activity considering the current conditions. For example, in a standard distribution, activity that is beyond a standard deviation taken in the context of externally influencing correlated factors. Embodiments generate a model of past activity and past conditions that is then compared to current conditions to determine if an activity is unexpected and how far outside the bounds of normality the activity is or how much risk the activity entails and whether the risk is appropriate given the circumstances.

Embodiments use a RNN architecture referred to as a recurrent (bottleneck) autoencoder. Using a recurrent autoencoder approach, the system encodes the input data and then reconstructs the data on the output side. The model is trained using historical participant and external factor data. Training the model reduces the error between the input and reconstructed data set. A recurrent autoencoder identifies patterns by first compressing (encoding) the input data and then decompressing (decoding) to reconstruct the input data. Data with a high degree of structure (as opposed to random data) provides for a higher compression ratio as the compressing encoder leverages the structure to reduce the compressed data size. The patterns or relationships that are identified when training are used by the model to identify the similarity of new transactions to previous transactions, e.g. to identify outlier transactions that may be unexpected given the transaction data and external factors.

Embodiments provide a method by which the risk profile of a trading entity and the factors that affect it such as the risk profile of the general market at a given time T may be correlated by means of a non-linear representation network such as a RNN. Further the network may be used in real time, inputting activity from the entity and the environment events to detect any anomalies in the activity that could adversely affect the risk profile of the entity.

The disclosed embodiments may be implemented to increase the timing and efficiency in the computational system. Activity may be tracked by an activity module. Risk may be assessed using a risk processor. Participant activity may be recorded and predicted, efficiently and accurately without additional user input. The increased efficiency and decreased usage of resources may lead to a less risky market, resulting in additional trading, fewer outlier events, and the ability to identify and prohibit human or machine error.

One exemplary environment where detecting abnormal activity is desirable is in financial markets, and in particular, electronic financial exchanges, such as a futures exchange, such as the Chicago Mercantile Exchange Inc. (CME). In particular, an exchange may enable the profiling of a market participant using machine learning techniques, which when trained in an unsupervised manner may identify the normal trading patterns for individual firms and participants. The model may classify similar data together and may learn to make predictions from the data. This may them be used to proactively monitoring the current trading patterns including both order flow and filled pattern of a firm and alert before hard coded limits are breached. With the order entry volumes and execution speeds involved in the markets due to high frequency and algorithmic traders, this approach may help detect when trading algorithms are not functioning properly.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles, and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as the debt obligations occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant may have a ripple effect on the solvency of the other participants. Conversely, CME's mark-to-the-market system does not allow losses to accumulate over time or allow a market participant the opportunity to defer losses associated with market positions.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. For example, an exchange must respond to inputs, such as trader orders, cancellations, etc., in a manner as expected by the market participants, such as based on market data, e.g., prices, available counter-orders, etc., to provide an expected level of certainty that transactions may occur in a consistent and predictable manner and without unknown or unascertainable risks. In addition, it should be appreciated that electronic trading systems further impose additional expectations and demands by market participants as to transaction processing speed, latency, capacity, and response time, while creating additional complexities relating thereto. The disclosed embodiments may further include functionality to ensure that the expectations of market participants are met, e.g., that transactional integrity and predictable system responses are maintained.

As was discussed above, electronic trading systems ideally attempt to offer an efficient, fair, and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Although described below in connection with examples involving instruments having multiple components, such as calendar and butterfly spread instruments, the methods described herein are well suited for determining final values for any variety of objects conforming to a set of rules or relationships.

Generally, the disclosed embodiments may enable the profiling of a market participant using machine learning techniques. A model trained in either an unsupervised or supervised manner identifies normal trading patterns for participants. The model classifies similar data together and learns to make predictions from the data. Then model may be used to proactively monitor the current trading patterns of a participant and alert before hard coded limits are breached. The model uses both participant data and market data, both past and present to identify patterns. The model is updated as new data is received. With the order entry volumes and execution speeds involved in markets due to high frequency and algorithmic traders, the model allows for abnormal activity to be identified and deflected when trading algorithms are misbehaving.

When a computer processor attempts to compute a large number of data sets in an environment including rules constraints and data constraints, the number of possible solutions or combinations of values may become unwieldy. A generic computer structure may not be able to handle the data processing required to accurately and timely identify and address abnormal activity. The disclosed embodiments allow for the computer processing system to efficiently and accurately use structured neural networks to provide risk control, detect abnormal market activity, and prevent related losses. The disclosed embodiments allow for timely and accurate risk control allowing the market to function efficiency.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The methods and systems described herein may be integrated or otherwise combined with other various risk management methods and systems, such as the risk management methods and systems described in U.S. Pat. No. 7,769,667 entitled "System and Method for Activity Based Margining" (the '667 patent"), the entire disclosure of which is incorporated by reference herein and relied upon. For example, the methods and systems described herein may be configured as a component or module of the risk management systems described in the above-referenced patent. Alternatively, or additionally, the disclosed methods may generate data to be provided to the systems described in the above-referenced patent.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

It should be appreciated that the disclosed embodiments may use other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop, or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be coupled with an activity module 142 that is configured to identify non-normal activity. The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios.

The activity module 142 may receive input from the trade database, market database, and order processing module. The activity module 142 may be configured to model a participant or firm's past activity considering market parameters. The activity module 142 may be configured to identify unexpected new transactions or new transactional risks. The activity module 142 may be configured to continuously generate a model for each of a customer, firm, or market. The activity module 142 may be configured to generate an alert to the Exchange or market participant when the activity module 142 detects activity exceeding an abnormality threshold level as established by the neural network through prior training under various market conditions.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user may interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for modeling participant activity.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
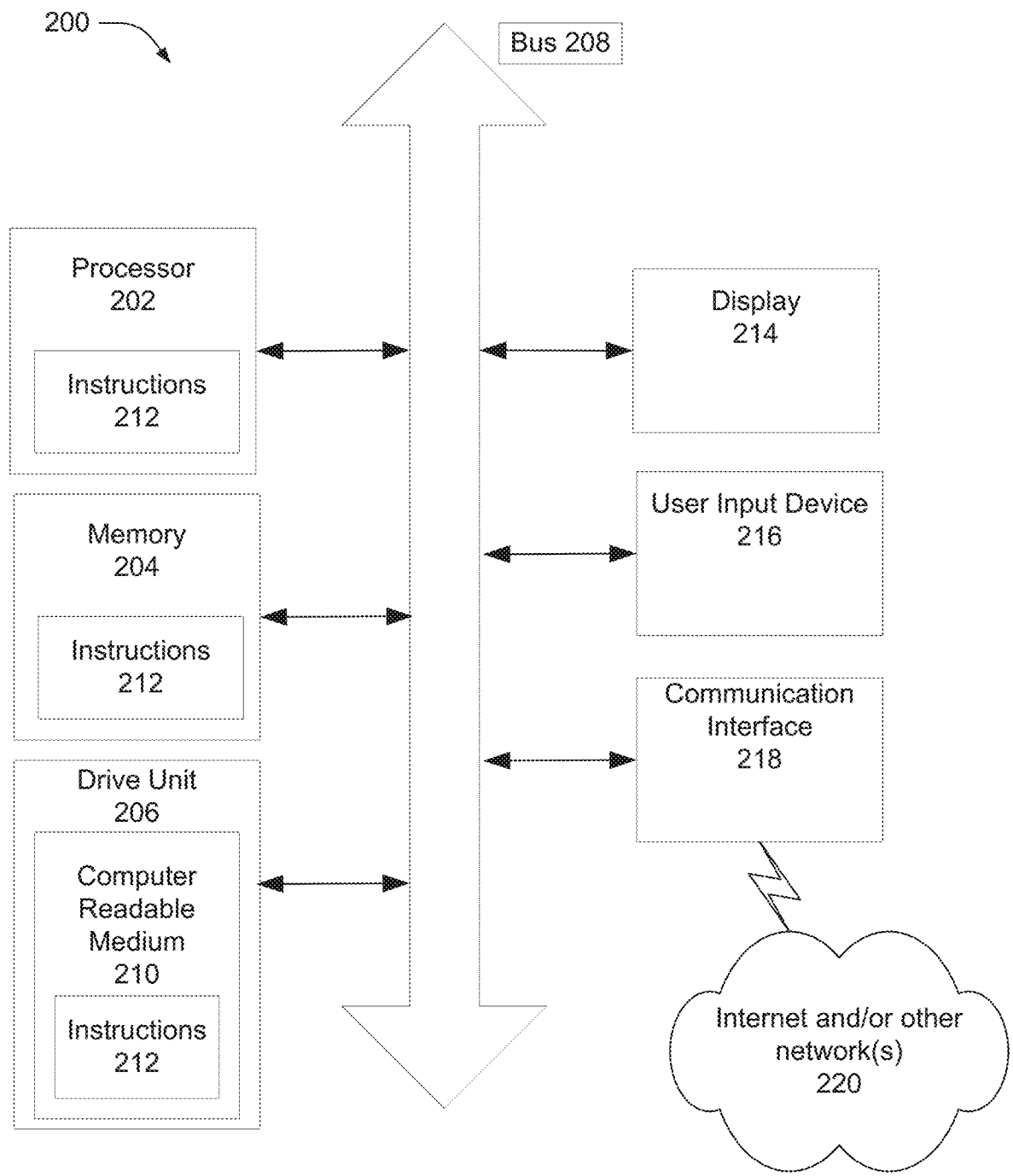
FIG. 2 depicts an illustrative embodiment of a general computer system for use with the disclosed embodiments.

Referring to FIG. 2, an illustrative embodiment of a general computer system 200 is shown. The computer system 200 may include a set of instructions that may be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, risk analysis, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 may be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that may communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, may be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 may communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory.

Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well. Feedback provided to the user may be any form of sensory feedback, e.g., visual feedback, auditory feedback, or tactile feedback. Input from the user may be received in any form, including acoustic, speech, or tactile input.

Embodiments of the subject matter described in this specification may be implemented in a computing system that includes a back end component, e.g., a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other. A system may depend on certain rules, logic, and inter-related objects and data. In technical and computing environments, a system may calculate values for multiple objects subject to rules, e.g., business or environment logic, associated with the objects. Certain object types may also depend on other object types.

Figure 3:
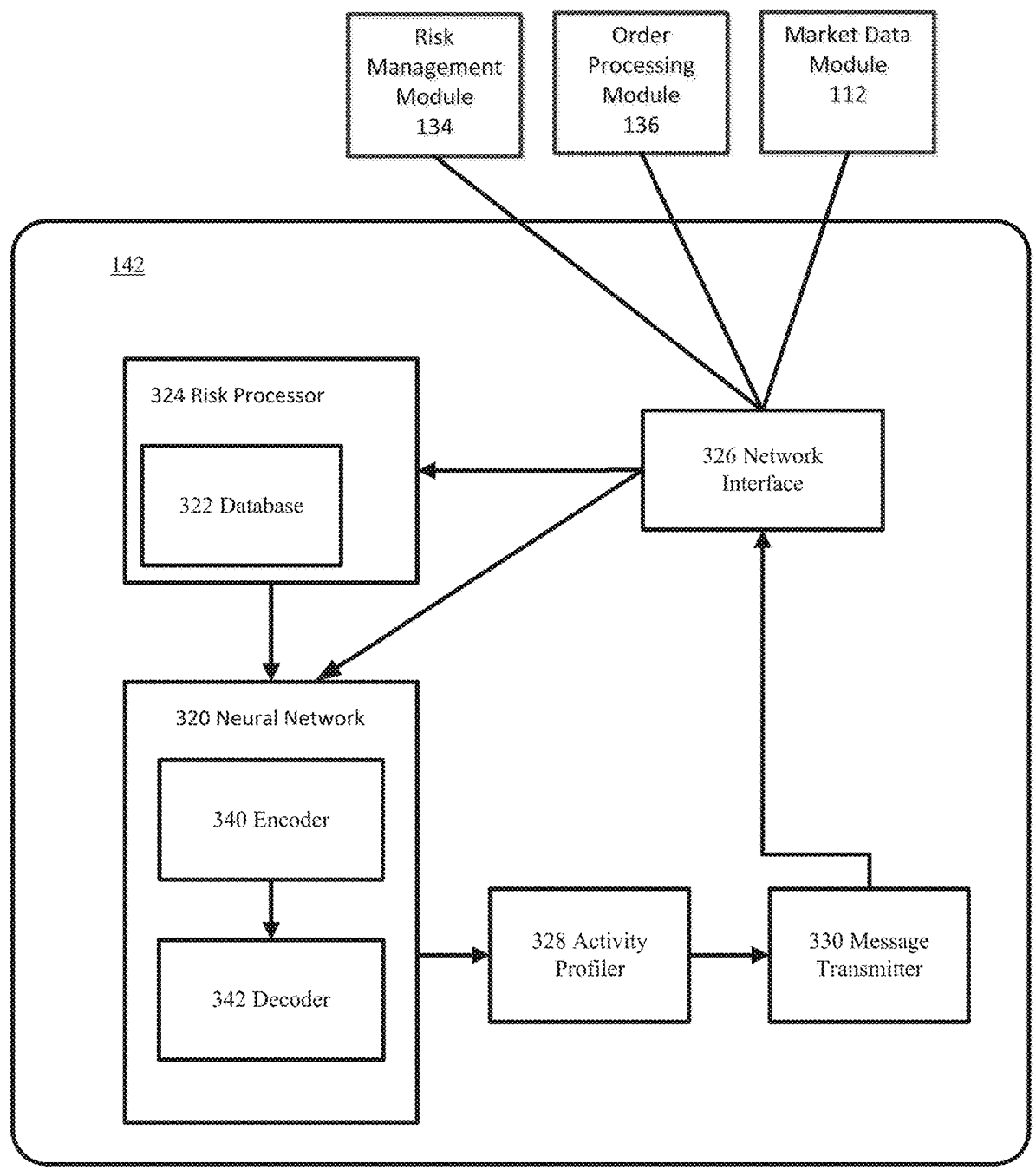
FIG. 3 depicts an illustrative example of an activity module of the computer network system of FIG. 1.

FIG. 3 depicts an illustrative embodiment of an activity module 142. FIG. 3 includes a neural network 320, a risk processor 324, a network interface 326, an activity profiler 328, and a message transmitter 330. The activity module 142 may be connected to systems or machines outside the exchange system. The activity module 142 may communicate with users, traders, and brokers outside of the exchange system, such as via wide area network 126 and/or local area network 124 and computer devices 114, 116, 118, 120 and 122. The activity module 142 may be configured to monitor transactions, identify abnormal transaction, and generate and transmit an alert message. The activity module 142 may be configured to train a recurrent neural network 320 using historical transaction and market data. The activity module 142 may be configured to compare received transactions with historical transactions in consideration of current external factors, using the recurrent neural network 320. The activity module 142 may be implemented in part as an application on one of the computer devices 114, 116, 118, 120 and 122. The activity module 142 may be part of the exchange computer system 100.

The risk processor 324 may be configured to generate a risk profile of a participant or firm and a risk profile for a transactional environment. The risk processor 324 may receive input from the network interface 326 and transmit data to the neural network 320. The input from the network interface 326 may include transaction data or market factor data, for example, received from the risk management module 134, order processing module 136, market data module 112, or other component of the exchange. The transaction data may include, for example, order, fill or other data relating to one or more transactions or transaction requests. The network interface 326 may further communicate directly with a participant or a source for market data. Risk processor 324 may generate from the received data, one or more risk profiles. A risk profile may be based on a statistical technique referred to as value at risk (VaR). VaR determines a potential for loss for the participant being assessed, as well as the probability of occurrence for the defined loss. VaR is measured by assessing the amount of potential loss, the probability of occurrence for the amount of loss and the time frame. VaR may be applied to a participant, a firm, a market, an individual, or other entity. VaR may be calculated for different periods of time and may include current transactional data. In an embodiment, the risk profile may be based on profit and loss over a period of time. In an embodiment, the risk profile may be based on a function provided by a participant. The risk processor 324 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the risk processor 324 to, or otherwise be operative to generate a risk profile. The risk processor 324 may store transaction and market data in a database 322. The risk processor 324 may store a plurality of generated risk profiles in the database 322.

The database 322 may be configured to store transaction data, external factor data, or generated risk profiles for one or more participants, firms, or market environments. The transaction data in the database 322 may correspond to external factor data or vice versa. For example, the database 322 may store the external factors that exist when each transaction is received. The database 322 may include fewer entries for the external factors than the transaction data. For example, the external factors may be calculated for a time period where there are multiple transactions by the participant. The external factors calculated for the time period may then correspond to each of the transactions that occurs during the period. The risk profile data may be generated by the risk processor 324 and may include risk profiles for a single participant, a firm, a collection of participants, a single market, a collection of market, etc. The risk profile data may include multiple risk profiles for each of the entities, for example each calculated in a different manner.

The database 322 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the database to, or otherwise be operative to store a plurality of parameters.

The neural network 320 may be configured to identify one or more patterns in a set of historical data. The neural network 320 may be configured to identify relationships between inputs in a set of historical data. The neural network 320 may be configured to receive data from the database 322 of the risk processor 324. The neural network 320 may receive data directly from the network interface 326. The neural network 320 may be configured to learn the normal trading profile of a participant during a trade day based on the products traded and to learn the patterns of the product itself. A large data set may be run through the model to enable the internal structure of the model to be trained. The data set may be encoded by the model and stored as a trading pattern database. The neural network 320 may be trained in a supervised manner or may be trained in an unsupervised manner.

The neural network 320 may be configured to compare received transaction data and other environmental data to historical transactions and historical environmental data to determine if the current activity deviates from the historical activity considering the state of the environment. The neural network 320 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the neural network to, or otherwise be operative to identify one or more patterns and determine a similarity between normal activity and current activity. The neural network 320 may be a structured neural network represented by a set of interconnected nodes that are configured to identify patterns in a set of data. The interconnected nodes may be grouped together in an encoder 340 and a decoder 342.

The activity profiler 328 may be configured to receive data from the neural network 320 that describes a level of deviation from normal activity. The activity profiler 328 may compare the level of deviation to a threshold level and determine an action that should be taken. For example, if the level of deviation exceeds an alert threshold level, the activity profiler 328 may generate an alert or instruct the message transmitter 330 to generate an alert. If the level of deviation exceeds a slowdown threshold, the activity profiler 328 may generate an instruction to slow down order from a participant. The activity profiler 328 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the activity profiler 328 to determine an action as a function of a level of deviation.

The message transmitter 330 may be configured to generate and transmit alert messages. The message transmitter 330 may communicate with the network interface 326 to transmit a generated message. The message transmitter 330 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the message transmitter 330 to, or otherwise be operative to generate and transmit an alert message.

Figure 4:
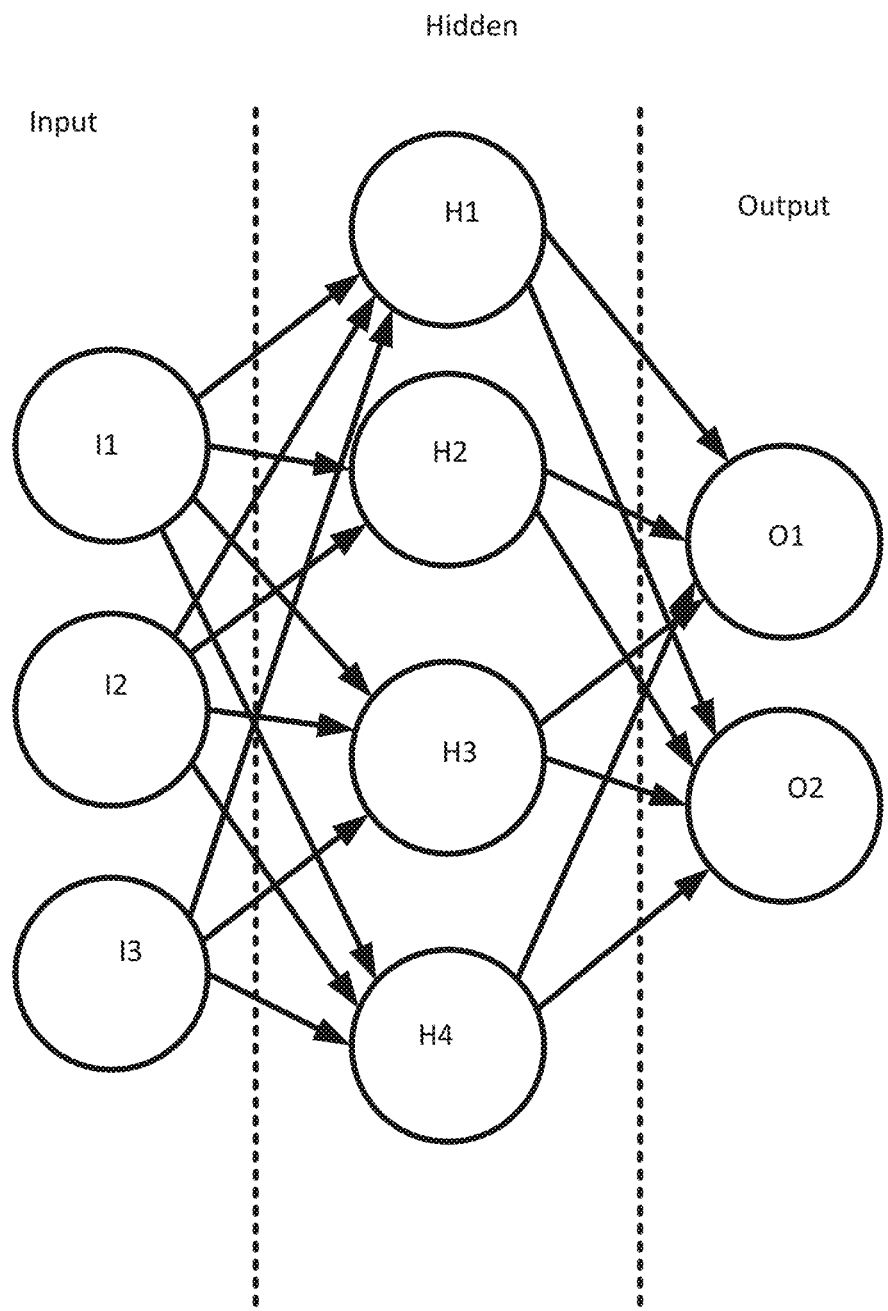
FIG. 4 depicts an illustrative example of neural network.

FIG. 4 depicts a plurality of nodes (I1-I3, H1-H4, and O1-O2) in an example neural network 320. Each node has a weighted connection (indicated by the arrows) to one or more other linked nodes in adjacent layers. There are three layers in FIG. 4, an input layer, a hidden layer, and an output layer. There may be multiple hidden layers depending on the complexity of the neural network 320. Nodes take input received from linked nodes and use the weights of the connected nodes together with a function for computation of output values. Neural networks may be created for supervised and/or unsupervised learning. The number of hidden layers along with the number of nodes within a specific hidden layer may be adjusted to achieve different levels of results.

As describe above, different types of neural networks exist. Two different types of neural networks are referred to as feed forward networks and recurrent networks. Both networks are named after the way the networks channel information through a series of operations performed at the nodes of the network. One (feedforward) feeds information straight through (never touching a given node twice), the other (recurrent) cycles information through a loop.

In the case of feedforward networks, information is input to the network and transformed into an output. In an example of a feedforward network, the nodes map raw data to categories, recognizing patterns that signal, for example, that an input image is labeled. Using the example of image recognition, a feedforward network is trained on labeled images until the feedforward network minimizes the error the network makes when labeling the categories. With the trained set of parameters, or weights, the network may categorize data that the network has never seen. A trained feedforward network may be presented a random collection of photographs, and the first photograph the network is exposed to may not necessarily alter how the network classifies the second. Identifying a first type for a first image may not lead the network to perceive a type of second image next. As such, a feedforward network has no notion of order in time, and the only input the network considers is the current example the network has been exposed to. Feedforward networks are amnesiacs regarding the previous inputs. Recurrent networks, however, take as inputs not just the current input, but also inputs at least one step back in time. Using the image recognition example, for a recurrent network seeing a first image may affect how the network classifies a second image.

In the feedforward network, all inputs (and outputs) may be independent of each other. The drawback for feedforward networks may be that for many tasks the inputs and outputs are not independent of one another. For example, when predicting the next word in a sentence, identifying which words came before the word is beneficial. Recurrent neural networks may alleviate the drawback. Recurrent neural networks are called recurrent because the network performs the same task for every element of a sequence, with the output taking into consideration the previous computations. Recurrent neural networks have a "memory" that captures and stores information about what has been calculated. Recurrent neural networks may make use of information in arbitrarily long sequences, but in practice recurrent neural networks are limited to looking back only a few steps.

The formulas that govern the computation in a recurrent neural network may be described as follows: $X(t)$ is the input at time step T. For example, $X(1)$ maybe a one-hot vector (e.g. a 1×N matrix vector) corresponding to the second word of a sentence. S(t) is the hidden state at time step. The hidden state may be referred to as the "memory" of the network. S(t) is calculated based on the previous hidden state and the input at the current step, e.g. a function of X(t−1) and W(t−1). The function may be a nonlinearity such as tan h or a rectified linear unit (ReLU). O(t) is the output at step T.

The hidden state may be the memory of the network. S(t) captures information about what happened in all the previous time steps. The output at step O(t) is calculated solely based on the memory at time. While S(t) may in theory capture information from a long sequence, in practice S(t) may only be able to capture information from a few time steps ago due to complexity and computational limitations. In an embodiment, a specific type of hidden state may be used that is referred to as long short term memory (LSTM). LSTM may be configured to use information from temporally further back in the sequence than a standard node. LSTMs may be configured to gate (e.g. optionally let in) information, allowing for states to be stored from further back in a sequence.

Multiple outputs may not be necessary. For example, when predicting the risk of a transaction, only the final output may be useful (not the intermediary outputs). Similarly, inputs may not be needed at each time step.

In an embodiment, a type of recurrent neural network referred to as a recurrent bottleneck autoencoder is used to identify patterns in the participant and external data. A recurrent bottleneck autoencoder may be configured as a recurrent neural network with additional functionality. As described above, a recurrent neural network uses multiple inputs. Like other recurrent neural networks, the decision a recurrent bottleneck autoencoder reached at time step T−1 affects the decision the recurrent bottleneck autoencoder may reach one moment later at time step T. A recurrent bottleneck autoencoder describes the structure of the nodes, more specifically how the number of nodes in layers decreases from the input to a point (compresses) and then increases (decompresses) to generate an output.

Figure 5:
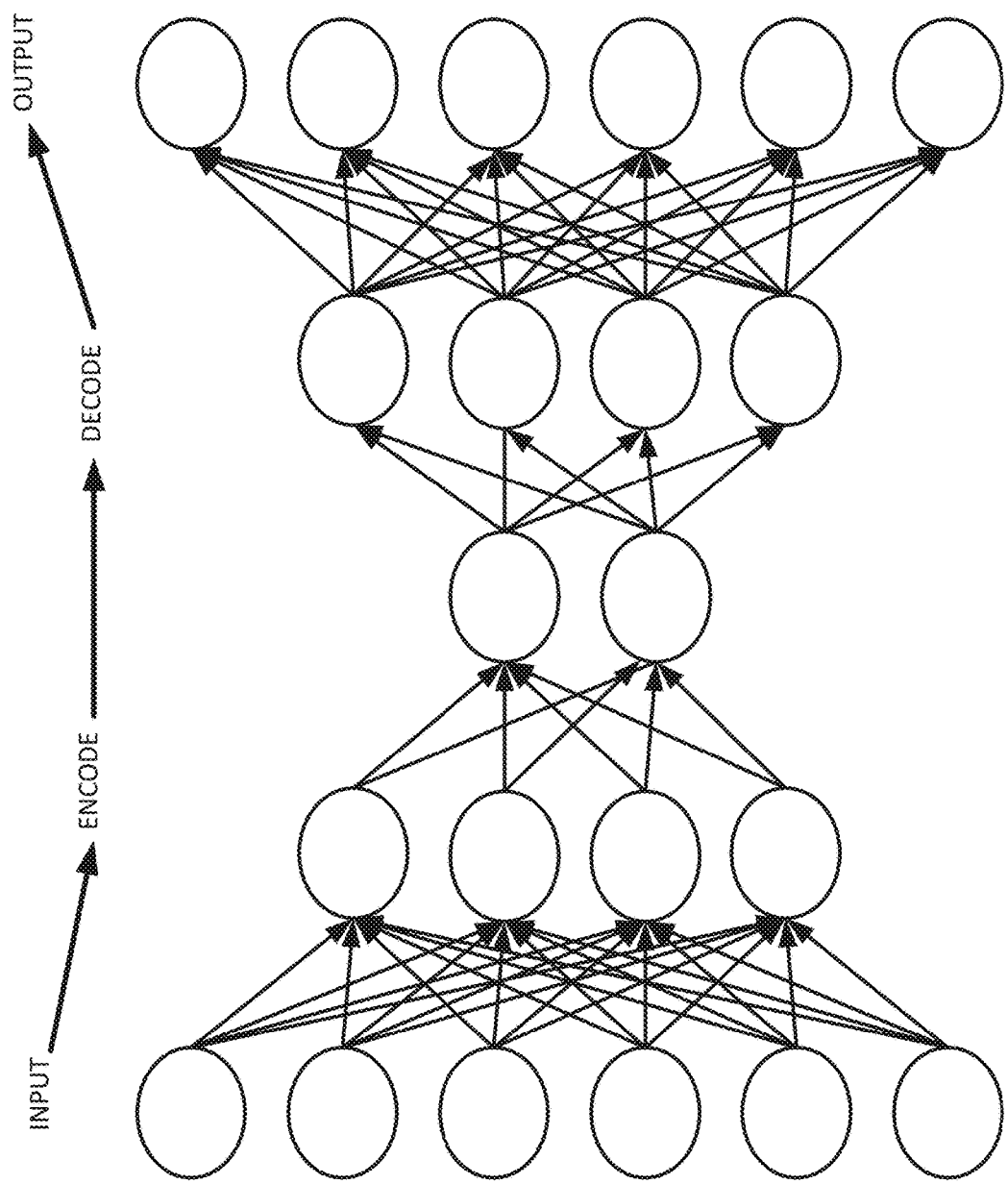
FIG. 5 depicts an illustrative example of a recurrent autoencoder neural network.

FIG. 5 depicts a recurrent bottleneck autoencoder according to an embodiment. FIG. 5 includes a plurality of nodes (circles) in layers and a plurality of connections (arrows) between the nodes. In an embodiment, a structure of different size in terms on the number of hidden layers and the number of nodes per layer may be used. In an embodiment, the size of the structure selected may be optimized in terms of the trade-off between accuracy and computation load. In an embodiment, the recurrent layers may use LSTM Units with a tan h activation on the outputs and logistic sigmoid gates. Only the outputs of the final encoder layer are connected to the inputs of the decoder, with no additional connections between encoder and decoder layers.

As described above, a recurrent neural network may be based on Long Short Term Memory (LSTM). A LSTM network may analyze streams of interrelated events and identify patterns between the events that are similar and have a high probability of recurrence based on historical trends. A LSTM based network may be used to identify similarities in vectors representing partially deconstructed data and produce as output the complete data or identify similarities between data by isolating and analyzing the objects within the data.

LSTMs may perform well by isolating different aspects of the input data into separate characteristics and then establishing relationships between the characteristics thorough observance of large data sets. LSTMs may not be as fast as other approaches in the modeling phase but are more flexible in establishing complex relationships between input elements with generalized training algorithms. Once trained the RNN structure may deliver a logical response to previously unseen inputs. In an embodiment, the structure established through training may handle large number of complex relationships through large number of hidden layers and training algorithms that help partition the RNN architecture into N-Dimensional hyperplanes representing the different characteristics seen in the data. Based on the input a different pack of nodes activates to indicate the characteristic the nodes have the most affinity to and the output is combined into a logical inference.

Referring back to FIG. 5, the neural network has two stages: an encoder stage including the left side of the network and a decoder stage including the right side of the network. During the encoder stage the number of hidden units decreases at each stage, effectively compressing the data. During the decoder stage the compressed data is reconstructed. If an optimized compression may be achieved at the same time as an optimized reconstruction, then the compressed representation may be expected to have captured patterns in the data.

To identify an optimized compression and optimized reconstruction, the structure of the neural network may be trained. The structure may be trained by end to end back-propagation through the encoder and decoder. When an input is presented to the structure, the input is propagated forward through the structure, layer by layer, until the inputted data reaches the output layer. The output of the network is then compared to the desired output, using a loss function, and an error value is calculated for each of the nodes in the output layer. In an embodiment, the inputs to the model may be encoded as a real-valued X-dimensional vector of participant and external factor parameters. At each time step, an input is fed through the layers of the encoder, with the hidden states updating based on the most recent input as well as on the existing hidden state from previous inputs. After the input sequence ends, the hidden state of the last recurrent layer is used to initialize the hidden state of the first recurrent layer of the decoder. This state is fed through the decoder layers to produce the output at the first-time step. The output is fed back into the input of the next time step of the decoder, making it a conditional recurrent network. The targets for the decoder correspond to the reversed input sequence and the error of the network is computed as the squared distance between output and target.

An example system with a recurrent autoencoder may be used to predict the risk of a transaction based on historical data. The training data is the risk history for a participant that have been recorded and stored. In the example, an input x is represents a value at risk (VaR) for set time periods for the participant up to yesterday, and an output y is the VaR of today. The input x is [x0, x1, . . . xT], where xi is the VaR of day i-th since the start of the historical data and the output y is the VaR of today. The goal of the example is to train the structure to predict y given all the x's. Other inputs may be used, such as external factors. External factors, for example, may be used to identify why a VaR changes for a specific day or transaction given the external factors.

In a recurrent network, x0, x1, . . . xT are VaR for a participant up to a current time; h0, h1, . . . hT are the hidden states of the recurrent network. For a recurrent neural network, there are typically three sets of parameters: the input to hidden weights (W), the hidden to hidden weights (U), and the hidden to label weight (V). All the W's are shared, all the U's are shared and all the V's are shared. The weight sharing property makes the network suitable for variable-sized inputs. Even if T grows, the size of the parameters stay the same: only W, U, and V. With the notations, the hidden states are recursively computed as: $f(x)=V\, hT$, $ht=\sigma(Uht-1+W\, xt)$, for $t=T, \ldots, 1 \ldots h0=\sigma(W\, x0)$ The cost function is minimized $(y-f(x))2$ to obtain the appropriate weights. To compute the gradient of the recurrent neural network, backpropagation may be used.

Backpropagation entails that when an input is presented to the structure, the input is propagated forward through the structure, layer by layer, until the input reaches the output layer. The output of the network is then compared to the desired output, using a loss function, and an error value is calculated for each of the nodes in the output layer.

Figure 6:
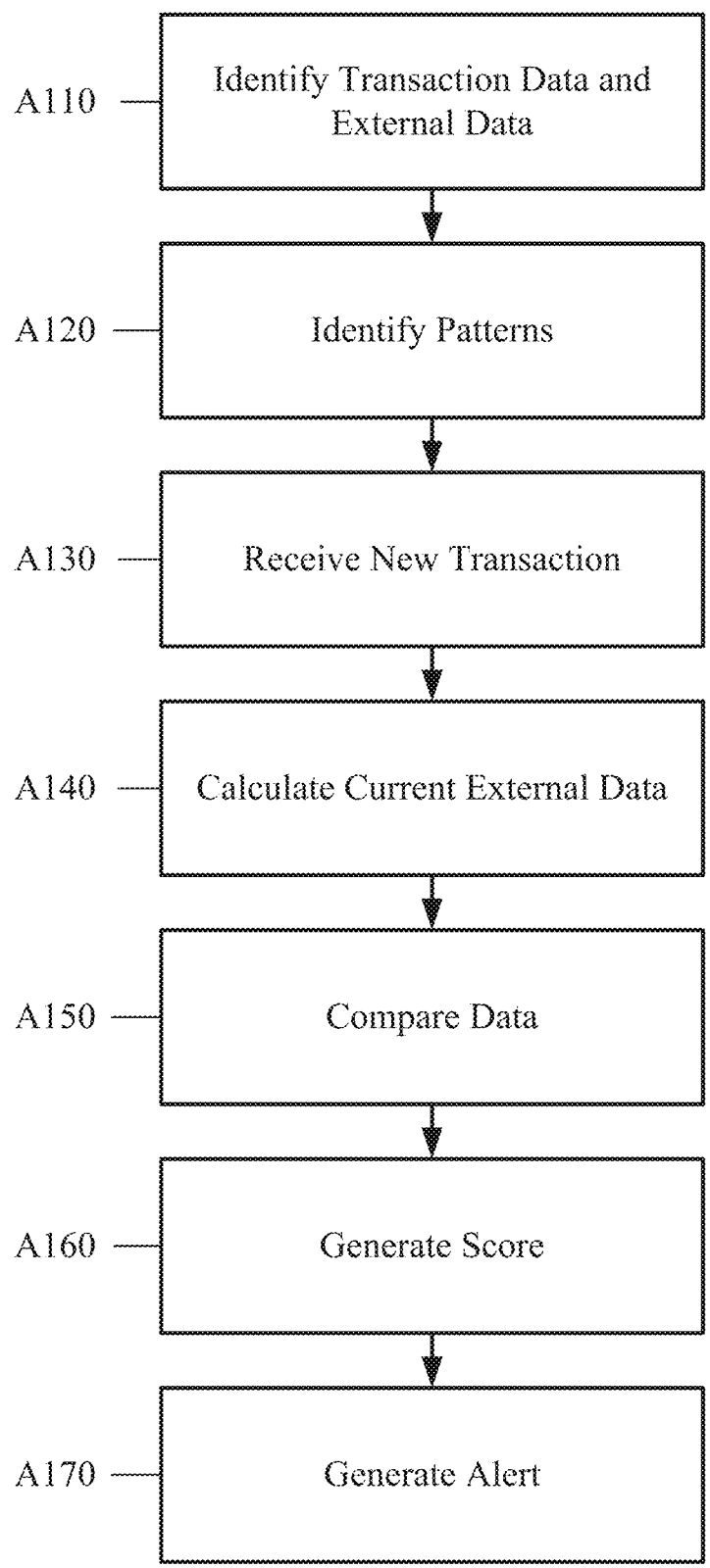
FIG. 6 depicts an example flowchart indicating a method of implementing the disclosed system for detecting abnormal activity by a participant in a data transaction processing system.

FIG. 6 depicts an example workflow of the operation of the activity module 142 of FIG. 3. The workflow in FIG. 6 may be used to identify parameters, establish baselines around the parameters and identify shifts with un-explained or lack of correlation to other parameters. FIG. 6 depicts a computer implemented method for detecting abnormal activity by a participant in a data transaction processing system in which data items are transacted by a hardware matching processor that matches electronic data transaction request messages for the same one of the data items based on multiple transaction parameters from different client computers over a data communication network.

At act A110, the activity module 142 identifies in a memory, historic transaction data for the participant and historic external factor data. The activity module 142 may receive and store data as new transactions are received and the external factors are identified. In an embodiment, a risk processor 324 may generate a risk profile using VaR at predefined time periods. In an embodiment, the risk processor may generate a risk profile using profit and loss (P&L) over a period of time. The activity module 142 may store information for a time period of a day, a week, a month, a year, or longer. The length of the time period may be adjusted depending on the type of transaction, type of participant, or external factors. The length of the time period may further be adjusted based on computational power. A longer period may include more information. A longer period may also include data that does not correlate due to external events that alter the landscape of the transactional environment. The data received and stored, or stored and identified by the activity module 142 may be divided into two sets, a participant set that includes data related to specific transaction initiated by a participant and an external factor set that includes data relating to other transactions and for example, a market as a whole.

The participant set may include parameters that are specific to the transaction traffic initiated by a single source. A single source may indicate a single trader for example, or a single organization includes multiple traders or organizations. The parameters may be with reference to the external factor parameters discussed below. For each transaction specific parameter, a standard deviation may also be identified and stored. A standard deviation may be a measure of the dispersion of a set of data from a mean value of the data. The standard deviation may provide insight into the distribution of data around the mean (average). A data point outside the standard deviation may indicate an abnormal event. A definition of the size of the standard deviation may be input by a user or predefined.

The participant set may include data related to historic transaction for a participant over a period of time. The length of the period of time may be dependent on the participant, the number of transactions to generate an accurate prediction, or computational limits. The participant set may exclude certain transactions that are not indicative of the trading pattern of the participant. For example, one or more abnormal (or erroneous) transactions may be identified and excluded from the set of historic transactions. The set of historic transactions may be used along with the external factors to identify abnormal events. As such, any events or transactions that have been deemed abnormal may not be used to train the structure to identify normal events.

The participant set of data may include data relating to the following types: VaR (Value at Risk)—risk exposure based on probability of occurrence of a loss of a certain amount. The data may include distinctions between Account, Portfolio, or firm level within a participant's data. For each transaction, the data may include an order size, a standard deviation of size, an incremental VaR associated with a new buy/sell, an order price, a differential of bids/offers from the best bid/offer (e.g. a mid-point difference), and open order risk. The participant set of data may further include long/short e.g. a standard deviation of how much outstanding notional value is in the market for the account on either side of the books. The participant set of data may include data relating to the price or quantify shift. The participant set of data may include data relating to the rate at which orders are being sent into the market for taking, a standard deviation of open position maintained in the market, a standard deviation of how long a market maker order typically stays on the book. The participant set of data may include data relating to a standard deviation of order distance from the inside of the market, a distance from a same side of book, and/or a distance from an opposite side of book. The participant set of data may include data relating to economic capital, e.g. a comparison between the account value or firm's assets against the Value at Risk and how the assets are doing against other firms in an exchange portfolio. The participant set of data may include data relating to a credit rating for a firm, profit and/or loss, and option Greeks.

The participant set of data may be received and stored or stored and identified with associated external factor parameters. The external factor parameters, also referred to as market factor parameters or environmental factors may assist in identifying correlation to participant parameters and may explain certain types of activity. The external factors may include, but are not limited to product volatility, e.g. dispersion of price values, market sentiment, e.g. Volatility (VIX) index, Index Health (+/−), Eventful time (+/−), Aggressing Order Rate, Time to expiration, and Economic/market releases, other similar participants, or similar firms, etc.

The participant set of data and the external factor parameters may be stored in a memory or database in the activity module 142. The data may be stored elsewhere in the exchange and accessed by the activity module 142 to train new structures. The participant set of data may be provided by a participant. For example, a participant may provide a set of data that exhibits normal trading activity by the participant (or idealized trading activity). The provided set may be associated with external factor data stored at the exchange or activity module 142 and then used to train the structure. The external factor data for example may be associated with time periods for which the participant transactional data may be matched. While each transaction by the participant may be stored, certain parameters in the external factor data may be updated once every predefined time period, for example, once every second, every minute, every hour, every day, etc.

At act A120, the activity module 142 identifies one or more patterns in the historic transaction data and the historic external factor data using a structured neural network. The activity module 142 may include a structured neural network. The structured neural network may be trained to detect patterns or relationships between inputs in a set of data. A neural network may include a tiered processing architecture made up of a plurality of interconnected processing nodes. Each connection of one processing node to another may be dynamically weighted. The dynamic weights may be adjusted during the training of the structure and as new data is received and evaluated. Different types of neural network structures are possible. In an embodiment, the activity module 142 includes a recurrent bottleneck autoencoder. A recurrent bottleneck autoencoder is a type of structured neural network that detects patterns by encoding and decoding data.

Nodes in a recurrent network may input outputs of the node, e.g. the node may perform a calculation based on previously outputted data. Nodes use hidden states to store information. Using the hidden states, recurrent networks may possess memory. An example of a hidden state calculation is given below:

$$h_t = \phi(Wx_t + Uh_{t-1}),$$

The hidden state at time step t is h(t). The hidden state is a function of the input at the same time step X(t) modified by a weight matrix W added to the hidden state of the previous time step h(t−1) multiplied by its own hidden-state-to-hidden-state matrix, otherwise known as a transition matrix and similar to a Markov chain. The weight matrices are filters that determine how much importance to accord to both the present input and the past hidden state. The error the states generate returns via backpropagation and may be used to adjust the weights until the error may not be reduced or reaches a point that satisfies an error threshold or computational limit.

The sum of the weight input and hidden state is squashed by the function either a logistic sigmoid function or tan h. Because this feedback loop occurs at every time step in the series, each hidden state contains traces not only of the previous hidden state, but also of all those that preceded h(t−1) for as long as memory may persist. Given a series of inputs, a recurrent network uses a previous input to help determine the structure's perception of die second input.

In an embodiment, the recurrent bottleneck autoencoder may be used in real time, inputting current transactional activity from the trading entity and the market events to detect any anomalies in the trading activity that could adversely affect the risk profile of the trading entity.

In an embodiment, the recurrent bottleneck autoencoder identifies relationships between a risk profile of a participant and a risk profile of an environment. The risk profile of the participant may be calculated by a VaR factor that indicates the probability of occurrence of loss by a certain factor by certain amount of time. The risk profile of the environment may be calculated by environmental health factors such as a sentiment index, volatility, etc. Risk profile factors that are longer term factors are overlaid with more short term activity factors such as the aggressing order rate for both the environment and the participant that provides an indication of 'panic' or 'opportunity' in the environment. The short-term factors may be influenced by the long-term factors and a reversal in that role is a sign of the risk profile changing drastically.

The recurrent bottleneck autoencoder identifies the relationships between the factors at time T as well as with the history of the same factors in the past at time T−1 and at Time T−2 and so on until Time T−n where 'n' is a sizeable amount of time during which the environment shows dependence on historical events and where 'n' is calculated by experimentation in the specific trading asset class. The time period T-n is also sized such that if the sample sets greater than that period is taken then conflicting environment characteristics are observed by the recurrent bottleneck autoencoder that may hinder training.

The correlation is achieved by means of a network of memory cells or nodes of the recurrent bottleneck autoencoder with depth 'd' such that the output of a node is based not only on the current input but on the weighted value of the previous input in the sequence. The depth 'd' of the structure may be adjusted through experimentation so that none of the Nodes are in the saturated range and are able to clearly classify all of the sample sets of data from a current time until time T-n in the past. In an embodiment, the architecture of the recurrent bottleneck autoencoder may be split into a zone of layers for classification and a zone of layers for determination of output.

In an embodiment, a structure may include 512 input nodes with 128 hidden layer nodes and 64 output layer nodes in the classification layers and then repeating that pattern for the layers for decoding the output provides for optimal results given the financial parameters above and the specific style of market products such as E-Mini, Crude Oil, Natural Gas, Eurodollars, Treasury Notes, Corn, Soybeans, Gold, and FX (EUR/USD, JPY/USD).

Furthermore, sliding the time window of T-n iteratively an input at a time into the RNN in order to a) incorporates variations in the market for training the recurrent bottleneck autoencoder and b) in cases of recurrent bottleneck autoencoder saturation quickly identify the sequence of events that may have led to an outlier situation and hence the saturation of the nodes.

At act A130, the activity module 142 receives from the participant, an electronic data transaction request message comprising data indicative of a transaction specifying a product, quantity and value, and storing the received electronic data transaction request message in the memory.

In an embodiment, the data indicative of the transaction is used to calculate a current participant profile that describes the outstanding risks for a participant. The current risk profile of the participant may be calculated using a risk exposure based on probability of occurrence of a loss of a certain amount. As each new transaction is received and the information identified, the current participant risk profile may be updated.

At act A140, the activity module 142 calculates current external factor data. The external factor parameters, also referred to as market factor parameters may assist in identifying correlation to participant parameters and may explain certain types of activity. The external factors may include, but are not limited to product volatility, e.g. dispersion of price values, market sentiment, e.g. Volatility (VIX) index, Index Health (+/−), Eventful time (+/−), Aggressing Order Rate, Time to expiration, and Economic/market releases.

The external factor data may be calculated for each transaction or may be calculated for a time period and associated with transactions that are received or occur during that transaction. In an embodiment, the activity module receives the current external factor data from, for example, the exchange. The external factor data may further be received from an external site or from a participant.

At act A150, the activity module 142 compares the data indicative of the transaction and the current external factor data with the one or more patterns. The structure of the recurrent bottleneck autoencoder identifies one or more patterns in the historical data. The patterns may be indicative of baseline normal transactional activity by the participant given the external factors. The data indicative of the order may include a price and volume for a product. The data indicative of the order may further include additional parameters. From the information in the electronic data transaction, the activity module 142 may generate a VaR that represents risk exposure based on probability of occurrence of a loss of a certain amount. The activity module 142 may compare the current transaction (or current risk profile) and current external factors with the baseline to determine if the transaction activity is normal or abnormal.

In an embodiment, the comparison may include determining a distance between the two data sets (historical and current). Functions such as using a metric space or analysis of variance may be used. In an embodiment, the comparison may include inputting the current transaction and current external factor data into the recurrent neural network. The output may be compared to an expected output. The difference between the output and the expected output may be used to generate an abnormality indicator or an abnormality score described below.

At act A160, the activity module 142 generates an abnormality score for the electronic data transaction based on the comparison. The abnormality score may represent a probability of how close a match the current participant's transaction activity or activity profile is to historic trading patterns for the participant. Normal activity may refer to a lack of significant deviation from the average activity.

A deviation from normal activity may be defined by using a standard deviation. For a normal distribution, there is a mean for the data, and the rest of the data fall symmetrically above and below that mean. Standard deviation as a measure informs how far scores fall on either side away from the mean. Standard deviation may represent a measure of the dispersion of a set of data from its mean. If the data points are further from the mean, there is higher deviation within the data set. Standard deviation may be calculated as the square root of variance by determining the variation between each data point relative to the mean. Alternative methods of determining abnormality may be used. A low statistical probability may define abnormality.

At act A170, the activity module 142 generates an alert when the abnormality score exceeds a threshold. An alert message may include an electronic message transmitted to the risk management system or risk management module of an exchange. The exchange may transmit a message to the participant. In an embodiment, the activity module 142 may prohibit a transaction from occurring if the abnormality score exceeds a second threshold that indicates that the activity is very abnormal. Very abnormal may, for example, indicate activity that is more than a predefined level of standard deviations from a mean or normal or expected activity.

In an embodiment, there may be multiple sets of patterns for a participant that describe historical activity for different aspects, for example, activity modules 142 focused on position (risk), P&L, order entry (i.e., velocity, volume, and price levels) by product type or business area. The activity module 142 may further include multiple RNNs, each of which correspond to a separate product or market.

In an embodiment, the recurrent bottleneck autoencoder may use LSTM units. Each LSTM unit has a cell which has a state at time t. This cell may represent a memory unit. Access to this memory unit for reading or modifying it is controlled through sigmoidal gates. LSTM architecture, which uses purpose built memory cells to store information may be used to exploit long range dependencies in the data.

Figure 7:
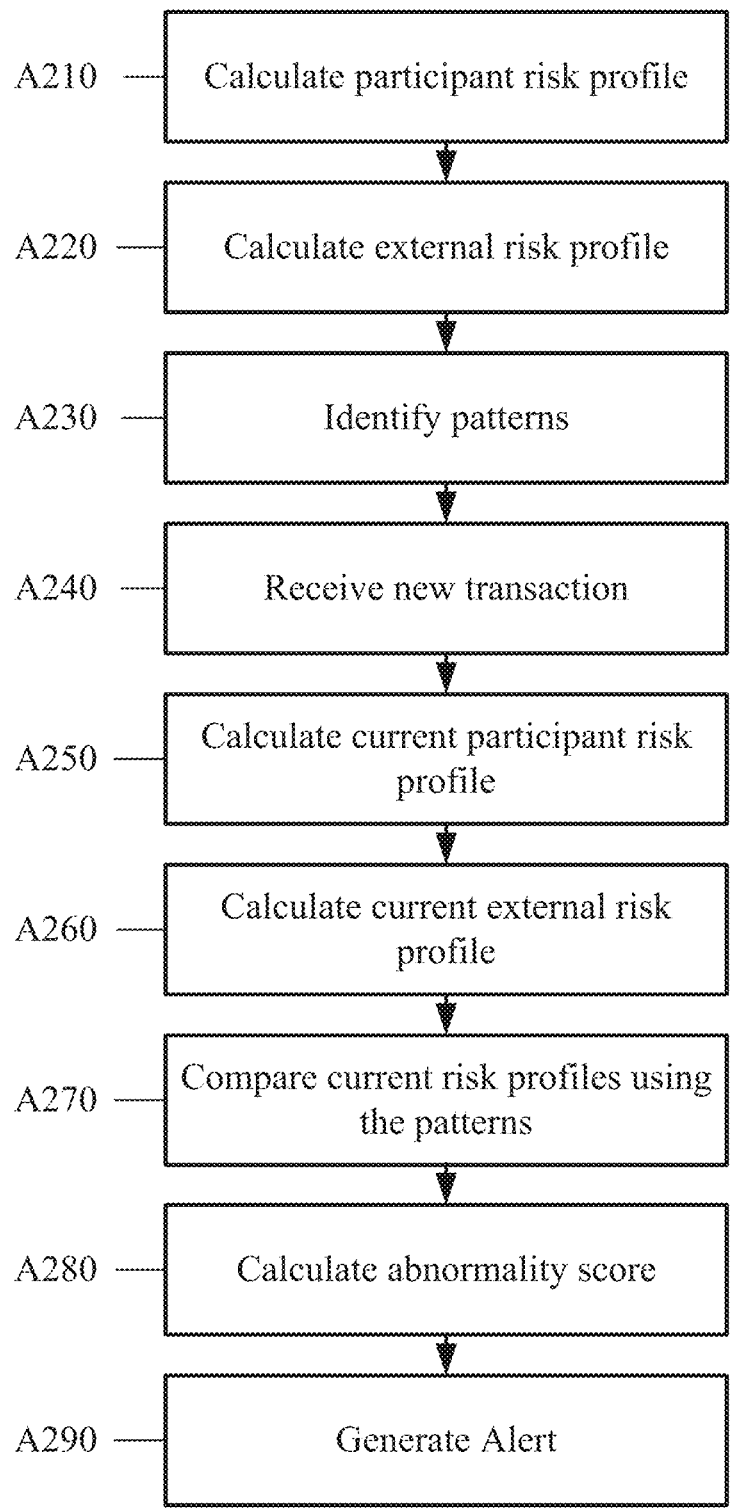
FIG. 7 depicts an example flowchart indicating a method of implementing the disclosed system for detecting abnormal activity by a participant in a data transaction processing system.

FIG. 7 depicts a workflow for detecting abnormal activity as may be implemented with computer devices and computer networks, such as those described with respect to FIG. 1, 2, or 3. Embodiments may involve all, more or fewer actions indicated by the blocks of FIG. 7. The actions may be performed in the order or sequence shown or in a different sequence.

At act A210, a risk processor 324 of an activity module 142 generates a plurality of risk profiles for the participant for a plurality of time periods. The plurality of risk profiles may be based on a plurality of historical participant parameters. Each of the risk profiles may correspond to a VaR for a portfolio for a participant for a specific time or time period. VaR may determine a potential for loss for the participant being assessed, as well as the probability of occurrence for the defined loss. VaR is measured by assessing the amount of potential loss, the probability of occurrence for the amount of loss, and the time frame. VaR may be calculated for a participant, a firm, an individual, or other entity. VaR may be calculated for different periods of time.

In an embodiment, a risk profile may be generated across one or more participants. For example, one or more participants may generate similar normal activity. The activity of the similar participants may be combined to generate a more accurate baseline normal risk profile. In an embodiment, a risk profile may be generated for a participant across a single market or selected group of products. A risk profile, for example, may only include transactional data for a single product as opposed to a risk profile that may track activity for a participant across multiple products or markets. In an embodiment, a user may adjust a risk profile to expand or shrink the bounds of expected activity.

At act A220 the risk processor 324 generates, a plurality of external risk profiles for the plurality of time periods, the plurality of external risk profiles based on a plurality of historical external factors. The external factors may include, but are not limited to product volatility, e.g. dispersion of price values, market sentiment, e.g. Volatility (VIX) index, Index Health (+/−), Eventful time (+/−), Aggressing Order Rate, Time to expiration, and Economic/market releases. An external risk profile may represent a credit risk level of the environment. The external risk profile may be calculated by weighting one or more of the external factors. The external risk profile may be calculated for a single market or product.

At act A230 the neural network 320 identifies a plurality of relationships between the plurality of risk profiles and plurality of external risk profiles using a structured neural network comprising a layered plurality of interconnected processing nodes. Each connection of the plurality of interconnected processing nodes to another may be dynamically weighted. The risk processor 324 may include a recurrent neural network 320 that is trained on the plurality of risk profiles and the plurality of external risk profiles. The neural network 320 may be separate from the risk processor 324. The recurrent neural network 320 may also use the individual parameters or factors as inputs for training. The recurrent neural network 320 may be an autoencoder recurrent neural network. An autoencoder network has two stages: an encoder stage and a decoder stage. During the encoder stage the number of hidden units decreases at each stage, effectively compressing the data. During the decoder stage the compressed data is reconstructed. If good compression is achieved at the same time as a good reconstruction, then the compressed representation may be expected to have captured patterns in the data.

At act A240 the risk processor 324 receives an electronic data transaction request message comprising data for a new transaction. The electronic data transaction request message may include data such as a price, product, and quantity.

At act A250 the risk processor 324 calculates a current external factor risk profile as a function of current external parameters. Similar to the historic external factor risk profiles, the current external factor risk profiles may represent a credit risk of the current environment. The current external factor risk profile may be calculated for the entire environment or a subset such as a single product or product type.

At act A260 the risk processor 324 calculates a current risk profile for the participant comprising at least the data for the new transaction. Similar to the historic risk profile, the current risk profile may represent a VaR for the participant at the time the electronic data transaction is received. VaR is a measure of the risk of investments. VaR estimates how much a set of investments might lose, given market conditions, in a set time period.

At act A270 the neural network 320 compares the current risk profile, current external factor risk profile, the plurality of risk profiles, and the plurality of external risk profiles using the plurality of relationships. The plurality of relationships may represent a model of a normal risk profile of a participant over a period of time given the external factors and external risk profiles. The current risk profile and current external factors may be compared to the baseline normal risk profiles, generating a comparison. A normal risk profile may be an indication of the normal risk a participant takes over time. Any deviation or abnormal activity that may result in a loss may generate a risk profile that is deviant or abnormal.

At act A280 the neural network 320 calculates an abnormality score based on the comparison. An abnormality score may be a quantification of how similar the current risk profile, current external factor risk profile, the plurality of risk profiles, and the plurality of external risk profiles are. In an embodiment, the abnormality score may use a At act A290 an alert is generated when the abnormality score exceeds a threshold. The alert may be generated by the risk processor 324, an activity profiler 328, or the neural network 320. The alert may indicate a level of deviation from prior activity by the participant. Different alerts may be generated depending on the abnormality score. For example, for a 1 to 100 score (lower being more abnormal), a score of 70 or below may generate an alert. A score of 50 or below may generate an urgent alert. A score of 30 or below may send a command to the exchange to prohibit the transaction. Different scales or levels of alerts may be used by different participants or in different environments. The alert generated may include information regarding the risk profile of the participant or the environment.

Figure 8:
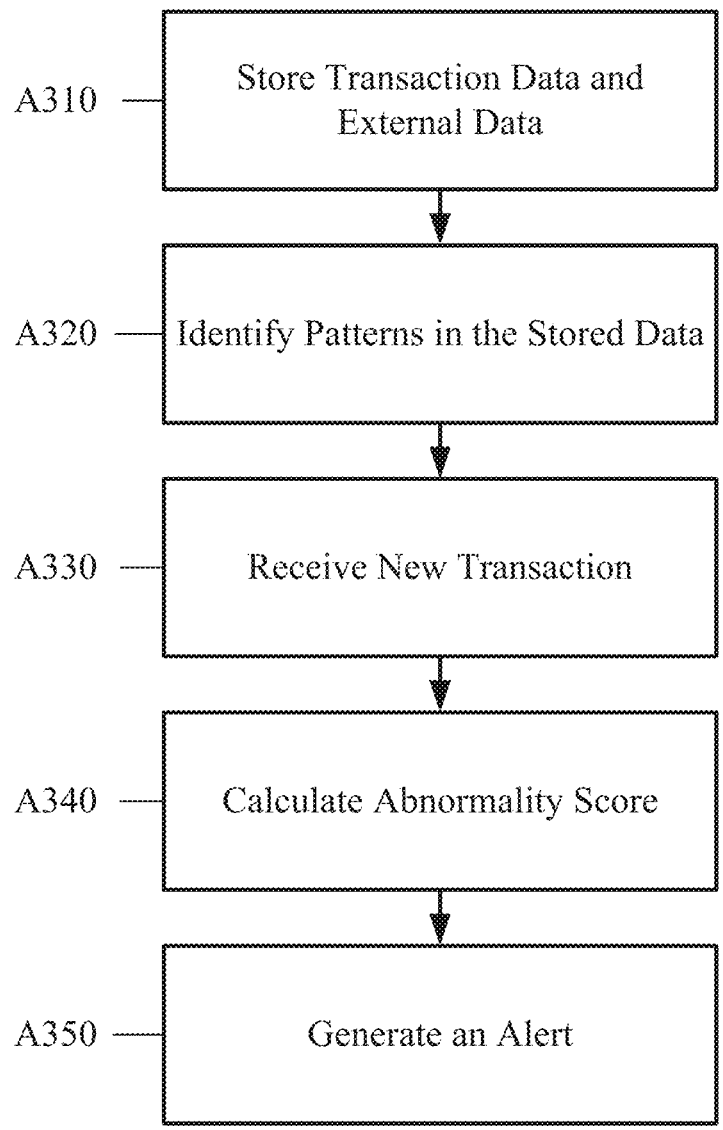
FIG. 8 depicts an example flowchart indicating a method of implementing the disclosed system for detecting abnormal activity by a participant in a data transaction processing system.

FIG. 8 depicts a workflow for detecting abnormal behavior as may be implemented with computer devices and computer networks, such as those described with respect to FIG. 1, 2, or 3. Embodiments may involve all, more or fewer actions indicated by the blocks of FIG. 8. The actions may be performed in the order or sequence shown or in a different sequence.

At act A310 historic participant transaction data and historic external factor data is stored in memory. The historic participant transaction data and the historic external factor data may be linked by time data. For example, when the transaction data is recorded, the external factor data may be recorded or stored as well. In an embodiment, the historic participant transaction data may be stored as portfolio data, for example, in a risk profile of a participant, firm, or other trading entity. The historic participant transaction data may be stored as the positions held by the participant, firm, or other trading entity for different time periods. In certain embodiments, the risk module in an exchange may calculate a risk profile for a participant for a plurality of time periods (e.g. at the end of each day to perform settlement).

At act A320, the activity module 142 identifies one or more patterns between the historic participant data and the historic external factor data for a time period. Identifying the patterns may include generating a model of normal participant activity considering the external factors. In an embodiment, a RNN architecture referred to as a recurrent bottleneck autoencoder is used. The architecture (model) may be trained using the historic participant data and the historic external factor data. For training the structure, input data (e.g. parameters) is encoded and then decoded. The trained structure may represent a profile of a participant's market activity during a trading day such that trading patterns may be compared against the structure and a prediction of credit worthiness or risk created. Autoencoders are a type of RNN that allows unsupervised learning of patterns within sequences. Once the patterns have been learned, the patterns may form the input to a search algorithm.

An autoencoder learns patterns by first compressing (encoding) the input data and then decompressing (decoding) to reconstruct the input data. Data with a high degree of structure (as opposed to random data) may allow for a higher compression ratio as the compressing encoder may leverage the structure to reduce the compressed data size. Finding a good compressing encoder essentially means finding structure or patterns in the input data.

The autoencoder neural network has two stages: an encoder stage and a decoder stage. During the encoder stage the number of hidden units decreases at each stage, effectively compressing the data. During the decoder stage the compressed data is reconstructed. If a good compression may be achieved at the same time as a good reconstruction, then the compressed representation to have captured patterns in the data.

The structure may be trained by end to end backpropagation through the encoder and decoder. The inputs to the structure are encoded as a real-valued X-dimensional vector of participant and environmental factor input parameters. At each time step, an input is fed through the layers of the encoder, with the hidden states updating based on the most recent input as well as on the existing hidden state from previous inputs. After the input sequence ends, the hidden state of the last recurrent layer is used to initialize the hidden state of the first recurrent layer of the decoder. The state is fed through the decoder layers to produce the output at the first-time step. The output is fed back into the input of the next time step of the decoder, making the network a conditional recurrent network. The targets for the decoder correspond to the reversed input sequence and the error of the network is computed as the squared distance between output and target.

At act A330, the activity module 142 receives new transaction data and current external factor data. The new transaction data and current external factor data may be received and stored at the exchange. The current external factor data may be calculated by one or more modules in the exchange or received from external sources. The new transaction data may be used to calculate an updated risk profile for a participant.

At act A340, the activity module 142 calculates, using the one or more patterns, an abnormality score that represents a level of deviation between the current transaction data and the historic participant transaction data. The new transaction data is encoded. The encoded value is compared against historic encoded data for the same instrument within a search time window. The nearest matches are returned. If the average of the difference between best matches and the target data set is outside an acceptable value, then an alert may be generated. The extent of the deviation from the acceptable value may be used to direct actions varying from warnings to interruption of trading.

At act A350, the activity module 142 generates an alert when the abnormality score exceeds a threshold. The output from the model may be a probability illustrating how close a match the current trading profile is to historic trading patterns for the firm. If this value is below a specified threshold, then a potential risk has been detected and an alert may be generated.

When applied to a financial exchange computer system, the embodiments described herein may utilize trade related electronic messages to enact trading activity in an electronic market. The trading entity and/or participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. As used herein, an exchange 100 includes a place or system that receives and/or executes orders.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   detecting a deviation from prior activity, inconsistent with current conditions, by a participant in a data transaction processing system in which data items are transacted by a hardware matching processor that matches electronic data transaction request messages for the same one of the data items based on multiple transaction parameters from different client computers over a data communication network by:
   identifying, by an activity module, in a memory, historic participant transaction data for the participant and historic external market factor data, wherein the historic external market factor data includes data indicative of characteristics of previous transactions by other participants and characteristics of a financial derivative product for a time period that corresponds to the historic participant transaction data that occurs during the time period, wherein the financial derivative product is traded on an exchange;
   identifying, by the activity module, one or more patterns in the historic participant transaction data and the historic external market factor data using a structured neural network, the structured neural network comprising a layered plurality of interconnected processing nodes, wherein each connection of the plurality of interconnected processing nodes to another is dynamically weighted, the one or more patterns indicative of historical normal activity by the participant in relation to the historic external market factor data;

receiving, by the activity module, from the participant, an electronic data transaction request message comprising data indicative of a current transaction specifying a product, quantity, and value, and storing the electronic data transaction request message in the memory;

calculating, by the activity module, current external market factor data;

comparing, by the activity module, the data indicative of the transaction and the current external market factor data with the one or more patterns;

generating, by the activity module, an abnormality score for the electronic data transaction request message based on the comparison; and generating, by the activity module, an alert when the abnormality score exceeds a first threshold.

2. The computer implemented method of claim 1, wherein identifying the one or more patterns comprises:

encoding, by the structured neural network, the historic participant transaction data and historic external market factor data using a plurality of first layers of the layered plurality of interconnected processing nodes;

decoding, by the structured neural network, the encoded data using a plurality of second layers of the layered plurality of interconnected processing nodes;

comparing, by the structured neural network, the decoded data with the historic participant transaction data and historic external market factor data; and identifying, by the structured neural network, the one or more patterns in the layered plurality of interconnected processing nodes when the decoded data is within a predefined distance of the historic participant transaction data and historic external market factor data.

3. The computer implemented method of claim 2, wherein the plurality of first layers comprise a decreasing number of nodes in each layer of the plurality of first layers, and the plurality of second layers comprise an increasing number of nodes in each layer of the plurality of second layers.

4. The computer implemented method of claim 3, wherein only the outputs of the smallest layer of the plurality of first layers is connected to the largest layer of the plurality of second layers.

5. The computer implemented method of claim 1, wherein the layered plurality of interconnected processing nodes comprises a plurality of long short term memory nodes.

6. The computer implemented method of claim 1, further comprising:

updating, by the activity module, the historic participant transaction data and the historic external market factor data with the current transaction data and current external market factors.

7. The computer implemented method of claim 1, further comprising:

prohibiting, by the activity module, the current transaction from being processed when the abnormality score exceeds a second threshold.

8. The computer implemented method of claim 1, wherein the interconnected processing nodes comprise long short term memory units.

9. The computer implemented method of claim 1, wherein the historic participant transaction data comprising data relating to a single or related set of products.

10. The computer implemented method of claim 1, further comprising:

calculating, by the activity module, a participant risk profile including the data indicative of a current transaction; wherein the one or more patterns represent a historical participant risk profile; wherein the participant risk profile is compared with the historical participant risk profile and the current external market factor data.

11. The computer implemented method of claim 10, wherein the participant risk profile is calculated as a function of a value at risk function that indicates a probability of occurrence of loss by a certain factor by a certain amount of time.

12. A computer implemented method comprising:

detecting a deviation from prior activity, inconsistent with current conditions, by a participant in a data transaction processing system in which data items are transacted by a hardware matching processor that matches electronic data transaction request messages for the same one of the data items based on multiple transaction parameters from different client computers over a data communication network by:

calculating, by a risk processor, a plurality of risk profiles for the participant for a plurality of time periods, the plurality of risk profiles based on a plurality of historical participant parameters;

calculating, by the risk processor, a plurality of external risk profiles for the plurality of time periods, the plurality of external risk profiles based on a plurality of historical external market parameters, wherein the plurality of historic external market parameters include data indicative of characteristics of previous transactions by other participants and characteristics of a financial derivative product that correspond to the plurality of historical participant parameters that occurs during the plurality of time periods, wherein the financial derivative product is traded on an exchange;

identifying, by a structured neural network a plurality of patterns between the plurality of risk profiles and the plurality of external risk profiles, the structured neural network comprising a layered plurality of interconnected processing nodes, wherein each connection of the plurality of interconnected processing nodes to another is dynamically weighted;

receiving, by the risk processor, electronic data transaction request messages comprising data for a new transaction;

calculating, by the risk processor, a current external factor risk profile as a function of current external market parameters;

generating, by the risk processor, a current risk profile for the participant comprising at least the data for the new transaction;

comparing, by the risk processor, the current risk profile, the current external factor risk profile, the plurality of risk profiles, and the plurality of external risk profiles using the plurality of patterns;

calculating, by the risk processor, an abnormality score based on the comparison; and generating, by the risk processor, an alert when the abnormality score exceeds a threshold.

13. The computer implemented method of claim 12, wherein calculating the plurality of risk profiles comprises calculating using a value at risk factor that indicates a probability of occurrence of loss by a predefined factor by a predefined amount of time.

14. The computer implemented method of claim 12, wherein identifying the one or more patterns comprises:
   encoding, by the structured neural network, the plurality of risk profiles and plurality of external risk profiles using a plurality of first layers of the layered plurality of interconnected processing nodes;
   decoding, by the structured neural network, the encoded data using a plurality of second layers of the layered plurality of interconnected processing nodes;
   comparing, by the structured neural network, the decoded data with the plurality of risk profiles and plurality of external risk profiles; and
   identifying, by the structured neural network, the one or more patterns in the layered plurality of interconnected processing nodes when the decoded data is within a predefined distance of the plurality of risk profiles and plurality of external risk profiles.

15. The computer implemented method of claim 14, wherein the plurality of first layers comprise a decreasing number of nodes in each layer of the plurality of first layers, and the plurality of second layers comprise an increasing number of nodes in each layer of the plurality of second layers.

16. The computer implemented method of claim 12, wherein the layered plurality of interconnected processing nodes comprises a plurality of long short term memory nodes.

17. The computer implemented method of claim 12, further comprising:
   updating, by the structured neural network, the plurality of patterns using the data indicative of the new transaction and the current external market parameters.

18. A computer implemented method comprising:
   detecting a deviation from prior activity, inconsistent with current conditions, by a participant in a data transaction processing system by:
      storing historic participant transaction data and historic external market factor data in memory, wherein the historic external market factor data includes data indicative of characteristics of previous transactions by other participants and characteristics of a financial derivative product for a time period that corresponds to the historic transaction data for the participant that occurs during the time period, wherein the financial derivative product is traded on an exchange;
      identifying one or more patterns between the historic participant transaction data and historic external market factor data using a recurrent neural network autoencoder comprising a layered plurality of interconnected processing nodes, wherein each connection of the plurality of interconnected processing nodes to another is dynamically weighted;
      receiving current transaction data from the participant;
      calculating using the one or more patterns, an abnormality score based on a similarity between the current transaction data and the historic participant transaction; and
      generating an alert when the abnormality score exceeds a threshold.

19. The computer implemented method of claim 18, wherein the layered plurality of interconnected processing nodes comprises a plurality of long short term memory nodes.

20. The computer implemented method of claim 18, wherein historic participant transaction data comprises transactions that do not exceed a predefined risk threshold.

21. A computer system for detecting a deviation from prior activity, inconsistent with current conditions, by a participant, the computer system comprising:
   a memory store configured to store a plurality of historic participant transactions of the participant and a plurality of historic external market factors, wherein the plurality of historic external market factors include data indicative of characteristics of transactions by other participants and characteristics of a financial derivative product for a time period that corresponds to the plurality of historic participant transactions that occur during the time period, wherein the financial derivative product is traded on an exchange;
   a recurrent neural network autoencoder configured to identify one or more patterns in the plurality of historic participant transactions and the plurality of historic external market factors, the recurrent neural network autoencoder comprising a layered plurality of interconnected processing nodes, wherein each connection of the plurality of interconnected processing nodes to another is dynamically weighted;
   a risk processor configured to receive a new transaction, analyze the new transaction using the one or more patterns and a plurality of current external market factors, and score the new transaction based on a similarity with the plurality of historic participant transactions; and
   a message transmitter configured to transmit an alert message when the similarity score of the new transaction does not exceed a threshold.

22. The computer system of claim 21, wherein the layered plurality of interconnected processing nodes comprises a plurality of long short term memory nodes.

23. The computer system of claim 21, wherein the recurrent neural network autoencoder is further configured to identify one or more updated patterns in the plurality of historic participant transactions, the plurality of historic external market factors, the new transaction data, and the plurality of current external market factors.

24. The computer system of claim 21, wherein the risk processor is further configured to calculate a risk profile for the new transaction and analyze the risk profile using the one or more patterns.

25. The computer system of claim 24, wherein the risk profile comprises a value at risk factor that indicates a probability of occurrence of loss by a predefined factor by a predefined amount of time.

26. A computer system for detecting a deviation from prior activity, inconsistent with current conditions, by a participant, the computer system comprising:
   means for storing historic participant transaction data for the participant and historic external market factor data, wherein the historic external market factor data include data indicative of characteristics of previous transactions by other participants and characteristics of a financial derivative product for a time period that corresponds to the historic participant transaction data that occurs during the time period, wherein the financial derivative product is traded on an exchange;

means for identifying one or more patterns in the historic participant transaction data and the historic external market factor data using a structured neural network, the structured neural network comprising a layered plurality of interconnected processing nodes, wherein each connection of the plurality of interconnected processing nodes to another is dynamically weighted, the one or more patterns indicative of historical normal activity by the participant in relation to the historic external market factor data;

means for receiving from the participant, an electronic data transaction request message comprising data indicative of a current transaction specifying a product, quantity, and value, and storing the electronic data transaction request message in the computer system;

means for calculating current external market factor data;

means for comparing the data indicative of the transaction and the current external market factor data with the one or more patterns;

means for generating an abnormality score for the electronic data transaction request message based on the comparison; and means for generating an alert when the abnormality score exceeds a first threshold.

* * * * *